United States Patent
Ożóg et al.

(10) Patent No.: US 12,410,755 B2
(45) Date of Patent: Sep. 9, 2025

(54) TRANSFERRING FUEL BETWEEN FUEL RESERVOIRS OF AN AIRCRAFT FUEL SYSTEM

(71) Applicant: Pratt & Whitney Canada Corp., Longueuil (CA)

(72) Inventors: Mateusz Ożóg, Hucisko (PL); Omer Abdul Wahab, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/424,183

(22) Filed: Jan. 26, 2024

(65) Prior Publication Data

US 2025/0243811 A1    Jul. 31, 2025

(51) Int. Cl.
*F02C 7/22* (2006.01)
*F23R 3/28* (2006.01)

(52) U.S. Cl.
CPC . *F02C 7/22* (2013.01); *F23R 3/28* (2013.01)

(58) Field of Classification Search
CPC . B64D 37/00; B64D 37/18; F02C 7/00; F02C 7/22; F02C 7/236; F02C 9/00; F23R 3/28
See application file for complete search history.

(56) References Cited

U.S. PATENT DOCUMENTS

| | | |
|---|---|---|
| 3,982,399 A | 9/1976 | Rookey |
| 5,660,358 A | 8/1997 | Grafwallner |
| 11,063,442 B2 | 7/2021 | Crawford |
| 11,258,081 B2 | 2/2022 | Min |
| 11,738,638 B2 | 8/2023 | Koo |
| 11,780,597 B2 * | 10/2023 | Swann .............. B64D 27/10 244/135 R |
| 11,796,132 B2 | 10/2023 | Saha |
| 11,828,417 B2 | 11/2023 | Clarke |
| 12,031,493 B2 * | 7/2024 | Swann ................. F02C 3/24 |
| 2022/0316410 A1 * | 10/2022 | Swann ................. F02C 9/40 |
| 2022/0324583 A1 | 10/2022 | Miftakhov |
| 2023/0015930 A1 * | 1/2023 | Meshkin Fam ...... B64D 37/30 |
| 2023/0193835 A1 * | 6/2023 | Swann .............. B64D 27/10 |
| 2023/0323820 A1 * | 10/2023 | Swann ................. F02C 9/26 60/39.094 |
| 2023/0339621 A1 * | 10/2023 | Sarkar ................. F02C 3/22 |
| 2023/0356856 A1 | 11/2023 | Gilmore |
| 2025/0153857 A1 | 5/2025 | Porterfield |

FOREIGN PATENT DOCUMENTS

WO    WO-2023074866 A1 *    5/2023
WO    2025114686 A1    6/2025

OTHER PUBLICATIONS

EP search report for EP25154261.9 dated Jun. 24, 2025.

* cited by examiner

*Primary Examiner* — Craig Kim
(74) *Attorney, Agent, or Firm* — Getz Balich LLC

(57) ABSTRACT

A method of operation is provided during which fuel is delivered to a powerplant using a fuel system. The powerplant and the fuel system are arranged onboard an aircraft. The fuel system includes a first fuel reservoir and a second fuel reservoir. The first fuel reservoir contains a quantity of the fuel. At least some of the quantity of the fuel contained in the first fuel reservoir is transferred into the second fuel reservoir when a fault is identified associated with the first fuel reservoir.

18 Claims, 2 Drawing Sheets

TRANSFERRING FUEL BETWEEN FUEL RESERVOIRS OF AN AIRCRAFT FUEL SYSTEM

TECHNICAL FIELD

This disclosure relates generally to an aircraft and, more particularly, to a fuel system for the aircraft.

BACKGROUND INFORMATION

An aircraft may include a fuel system for delivering fuel to a powerplant such as a gas turbine engine for an aircraft propulsion system. Various types and configurations of fuel systems are known in the art. While these known fuel systems have various benefits, there is still room in the art for improvement.

SUMMARY

According to an aspect of the present disclosure, a method of operation is provided during which fuel is delivered to a powerplant using a fuel system. The powerplant and the fuel system are arranged onboard an aircraft. The fuel system includes a first fuel reservoir and a second fuel reservoir. The first fuel reservoir contains a quantity of the fuel. At least some of the quantity of the fuel contained in the first fuel reservoir is transferred into the second fuel reservoir when a fault is identified associated with the first fuel reservoir.

According to another aspect of the present disclosure, an assembly is provided for an aircraft. This assembly includes an aircraft powerplant and a fuel system. The fuel system includes a supply circuit, an array of fuel reservoirs and a fuel control system. The array of fuel reservoirs includes a first fuel reservoir and a second fuel reservoir. The first fuel reservoir and the second fuel reservoir are fluidly couplable to the supply circuit in parallel. The fuel control system is configured to direct fuel stored in the array of fuel reservoirs to the aircraft powerplant through the supply circuit. The fuel control system is configured to transfer at least some of a quantity of the fuel contained in the first fuel reservoir into the second fuel reservoir following identification of a fault associated with the first fuel reservoir while the fuel continues to be directed to the aircraft powerplant through the supply circuit.

According to still another aspect of the present disclosure, another assembly is provided for an aircraft. This assembly includes an aircraft powerplant and a fuel system. The fuel system includes a supply circuit, an array of fuel reservoirs, a fuel delivery system and a fuel transfer system discrete from the fuel delivery system. The array of fuel reservoirs includes a first fuel reservoir and a second fuel reservoir. The first fuel reservoir and the second fuel reservoir are fluidly couplable to the supply circuit in parallel. The fuel delivery system is configured to direct hydrogen fuel stored in the array of fuel reservoirs to the aircraft powerplant through the supply circuit. The fuel transfer system is configured to transfer at least some of a quantity of the hydrogen fuel contained in the first fuel reservoir into the second fuel reservoir in response to identification of a fault associated with the first fuel reservoir.

The fuel system may be a hydrogen fuel system. The first fuel reservoir may be a first liquid hydrogen reservoir. The second fuel reservoir may be a second liquid hydrogen reservoir.

The fuel may be or otherwise include hydrogen fuel.

At least some (or all) of the fuel transferred from the first fuel reservoir into the second fuel reservoir may be in a gaseous phase.

At least some (or all) of the fuel transferred from the first fuel reservoir into the second fuel reservoir may be in a liquid phase.

The method may also include a step of identifying the fault associated with the fuel first reservoir.

The fault may be a fuel leak.

The fault may be indicative of a fuel leak from the first fuel reservoir.

The fault may be indicative of a fuel leak from a fuel line fluidly coupled to the first fuel reservoir.

The method may also include a step of fluidly decoupling the first fuel reservoir from a supply circuit of the fuel system when the fault is identified associated with the first fuel reservoir. The delivering of the fuel may include delivering the fuel to the powerplant through the supply circuit.

The fuel may be delivered to the powerplant using the fuel system before, during and after the transferring of the fuel from the first fuel reservoir into the second fuel reservoir.

The transferring may include pumping at least some (or all) of the quantity of the fuel contained in the first fuel reservoir into the second fuel reservoir.

The transferring may include opening a valve between the first fuel reservoir and the second fuel reservoir to equalize a fuel parameter between the first fuel reservoir and the second fuel reservoir.

The transferring of the fuel from the first fuel reservoir into the second fuel reservoir may increase a quantity of the fuel contained in the second fuel reservoir above a predetermined maximum capacity of the second fuel reservoir.

The method may also include a step of transferring some (or all) of the quantity of the fuel contained in the first fuel reservoir into a third fuel reservoir of the fuel system when the fault is identified associated with the first fuel reservoir.

The method may also include a step of venting some (or all) of the quantity of the fuel contained in the first fuel reservoir to an environment external to the aircraft during and/or following the transferring of the fuel from the first fuel reservoir into the second fuel reservoir.

The powerplant may be configured as or otherwise include a heat engine.

The powerplant may be configured as or otherwise include a fuel cell.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
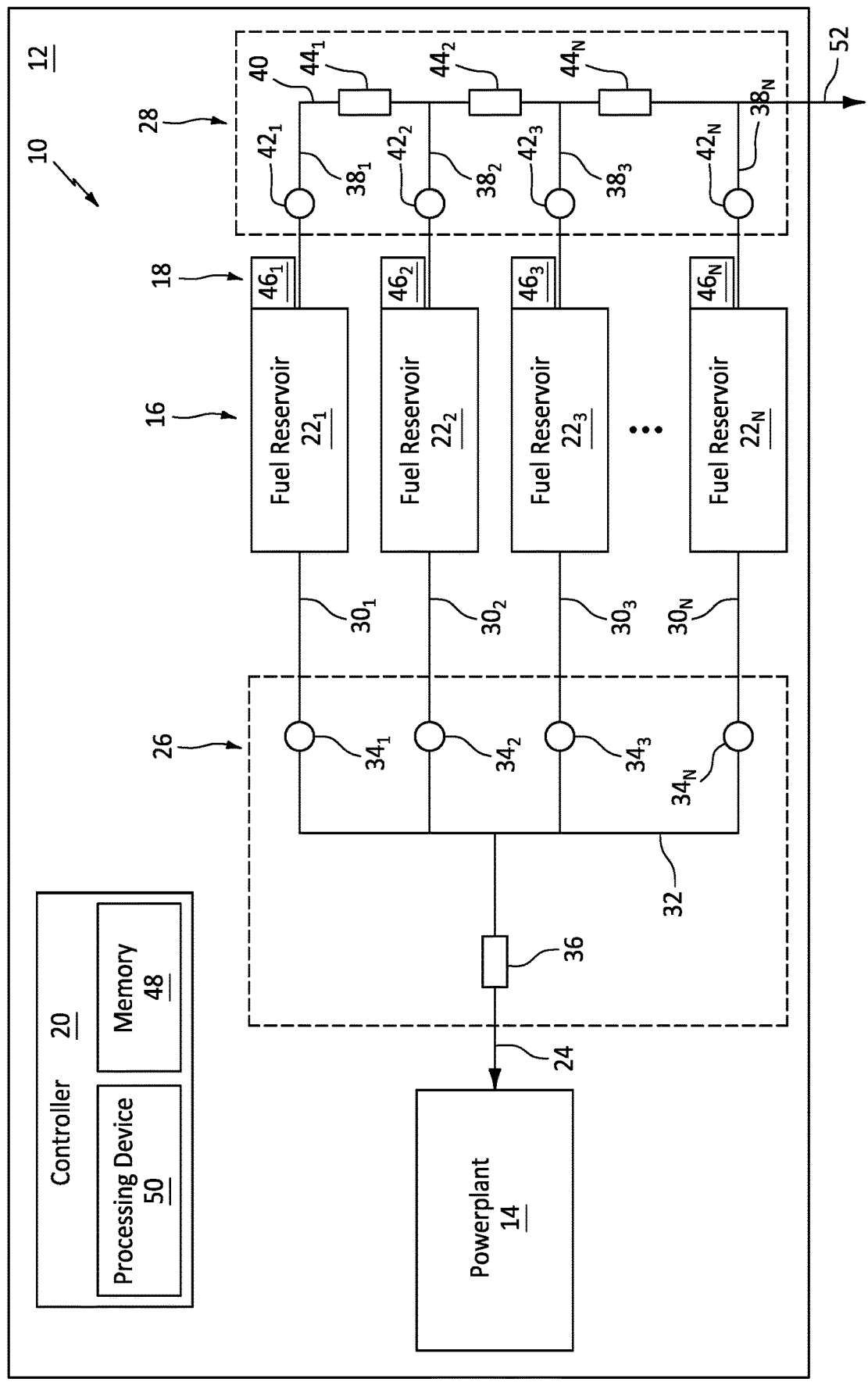
FIG. 1 is a schematic illustration of a system onboard an aircraft with a fuel system servicing a powerplant.

FIG. 1 illustrates a system 10 for an aircraft 12. The aircraft 12 may be an airplane, a helicopter, a drone (e.g., an unmanned aerial vehicle (UAV)) or any other manned or unmanned aerial vehicle or system. The aircraft system 10 is arranged onboard the aircraft 12 and is configured of use while the aircraft 12 is inflight and/or on ground. The aircraft system 10 of FIG. 1 includes a powerplant 14 for the aircraft 12 and a (e.g., a hydrogen) fuel system 16 for the aircraft 12 and its powerplant 14. The aircraft system 10 of FIG. 1 also includes a sensor system 18 and a controller 20.

The aircraft powerplant 14 may be configured as, or otherwise included as part of, a propulsion system for the aircraft 12. The aircraft powerplant 14 may also or alternatively be configured as, or otherwise included as part of, an electrical power system for the aircraft 12. The aircraft powerplant 14 may include a heat engine such as, but not limited to, a gas turbine engine, a rotary engine (e.g., a Wankel engine), a reciprocating piston engine or any other continuous or intermittent internal combustion (IC) engine. Examples of the gas turbine engine include a turbofan engine, a turbojet engine, a turboprop engine and a turboshaft engine. The aircraft powerplant 14 may also or alternatively include a fuel cell. The present disclosure, however, is not limited to the foregoing exemplary powerplant types or configurations.

The fuel system 16 is configured to store a quantity of fuel before, during and/or after operation of the aircraft 12, including inflight operation and on ground operation. The fuel system 16 is also configured to deliver a flow of the fuel to the aircraft powerplant 14 during operation of the aircraft powerplant 14. For ease of description, this fuel may be described below as a non-hydrocarbon fuel/a hydrocarbon-free fuel such as hydrogen fuel; e.g., pure $H_2$. However, it is contemplated the fuel may alternatively be a hydrocarbon fuel, particularly where the hydrocarbon fuel is stored and/or delivered to the aircraft powerplant 14 in a gaseous phase such as natural gas, propane or the like.

The fuel system 16 of FIG. 1 includes a plurality of (e.g., a hydrogen) fuel reservoirs 221-22N (generally referred to as "22") (e.g., fuel storage containers), a (e.g., a hydrogen) fuel control system and a fuel supply circuit 24. The fuel control system of FIG. 1 includes a (e.g., a hydrogen) fuel delivery system 26 and a (e.g., a hydrogen) fuel transfer system 28 which may be discrete from the fuel delivery system 26.

The fuel reservoirs 22 are arranged in an array. The fuel reservoirs 22 of FIG. 1, for example, are fluidly couplable to the fuel supply circuit 24 in parallel through the fuel delivery system 26. Each of the fuel reservoirs 22 is configured to contain and store a respective quantity of the fuel before, during and/or after operation of the aircraft 12. This quantity of the fuel may be stored within the respective fuel reservoir 22 in a liquid phase (e.g., as liquid hydrogen ($H_2$)) and/or in a gaseous phase (e.g., as hydrogen ($H_2$) gas). Each fuel reservoir 22, for example, may be configured as or otherwise include a tank, a cylinder, a bladder and/or any other (e.g., insulated) fluid-tight enclosure. Note, while the fuel reservoirs 22 are schematically shown in FIG. 1 in a side-by-side grouping, it is contemplated some or all of the fuel reservoirs 22 may alternatively be arranged at different locations and/or in different compartments of the aircraft 12.

The fuel delivery system 26 is configured to direct a flow of the fuel from the array of fuel reservoirs 22 through the fuel supply circuit 24 to the aircraft powerplant 14. The fuel delivery system 26 of FIG. 1, for example, includes a plurality of reservoir supply circuits 301-30N (generally referred to as "30"), a fuel supply manifold 32 and one or more fuel flow regulators 341-34N (generally referred to as "34") ("reservoir flow regulators"). Each reservoir supply circuit 30 fluidly couples an outlet from a respective one of the fuel reservoirs 22 to a respective inlet into the fuel supply manifold 32. The fuel supply circuit 24 fluidly couples an outlet from the fuel supply manifold 32 to the aircraft powerplant 14. The fuel supply manifold 32 of FIG. 1 is thereby configured to fluidly couple the reservoir supply circuits 30 and, thus, the fuel reservoirs 22 to the fuel supply circuit 24 in parallel. Each reservoir flow regulator 34 of FIG. 1 is fluidly coupled inline along a respective one of the reservoir supply circuits 30 between the respective fuel reservoir 22 and the fuel supply manifold 32. Each reservoir flow regulator 34 is configured to regulate a flow of the fuel from the respective fuel reservoir 22 to the fuel supply manifold 32 and, thus, the fuel supply circuit 24. Each reservoir flow regulator 34, for example, may selectively fluidly couple or decouple the respective fuel reservoir 22 to or from the fuel supply manifold 32. Each reservoir flow regulator 34 may also or alternatively adjust a flowrate of the fuel from the respective fuel reservoir 22 to the fuel supply manifold 32. Each reservoir flow regulator 34, for example, may be configured as or otherwise include a pump, a control valve or a valve system.

The fuel delivery system 26 may also include a common fuel flow regulator 36 ("supply flow regulator") for the array of fuel reservoirs 22. This supply flow regulator 36 is fluidly coupled inline along the fuel supply circuit 24 between the fuel supply manifold 32 and the aircraft powerplant 14. The supply flow regulator 36 is configured to regulate a flow of the fuel from the fuel supply manifold 32 to the aircraft powerplant 14. The supply flow regulator 36, for example, may selectively fluidly couple or decouple the fuel supply manifold 32 and, thus, the array of fuel reservoirs 22 to or from the aircraft powerplant 14. The supply flow regulator 36 may also or alternatively adjust a flowrate of the fuel from the fuel supply manifold 32 and, thus, the array of fuel reservoirs 22 to the aircraft powerplant 14. The supply flow regulator 36, for example, may be configured as or otherwise include a pump, a control valve or a valve system. In some embodiments, each reservoir flow regulator 34 may be configured as a control valve and the supply flow regulator 36 may be configured as a pump.

The fuel transfer system 28 is configured to selectively transfer the fuel between some or all of the fuel reservoirs 22. The fuel transfer system 28 of FIG. 1, for example, includes a plurality of reservoir transfer circuits 381-38N (generally referred to as "38"), a fuel transfer manifold 40, one or more transfer valves 421-42N (generally referred to as "42") and one or more transfer pumps 441-44N (generally referred to as "44"). Each reservoir transfer circuit 38 fluidly couples a transfer aperture of a respective one of the fuel reservoirs 22 to a respective transfer aperture of the fuel transfer manifold 40. Note, depending on operation of the fuel transfer system 28, one transfer aperture may be an outlet and the other transfer aperture may be an inlet. The fuel reservoirs 22 may thereby be fluidly coupled to the fuel transfer manifold 40 in parallel. Each transfer valve 42 of FIG. 1 is fluidly coupled inline along a respective one of the reservoir transfer circuits 38 between the respective fuel reservoir 22 and the fuel transfer manifold 40. Each transfer valve 42 is configured to regulate a flow of the fuel between the respective fuel reservoir 22 and the fuel transfer manifold 40. Each transfer valve 42, for example, may selectively fluidly couple or decouple the respective fuel reservoir 22 to or from the fuel transfer manifold 40. Each transfer valve 42 may also or alternatively adjust a flowrate of the fuel between the respective fuel reservoir 22 and the fuel transfer manifold 40. The transfer pumps 44 of FIG. 1 are fluidly coupled inline along the fuel transfer manifold 40. Each transfer pump 44 of FIG. 1, for example, is disposed along a portion of the fuel transfer manifold 40 between a neighboring (e.g., adjacent) set of the reservoir transfer circuits 38 and their transfer apertures. These transfer pumps 44 are configured to pump the fuel along the fuel transfer manifold 40 and selectively between any two or more of the reservoir transfer circuits 38.

The sensor system 18 is configured to identify a fault associated with one or more of the fuel reservoirs 22. The fault may be indicative of a fuel leak. The fault, for example, may be indicative of a fuel leak from a respective one of the fuel reservoirs 22; e.g., where the respective fuel reservoir 22 has a crack and/or a loose fitting. In another example, the fault may be indicative of a fuel leak from a fuel line (e.g., one of the circuits 30, 38) fluidly coupled to a respective one of the fuel reservoirs 22; e.g., where the respective fuel line has a crack and/or a loose coupling. Alternatively, the fault may be indicative of an abnormal fuel parameter; e.g., a fuel pressure, a fuel flowrate, etc. The sensor system 18 of FIG. 1 includes a plurality of sensors 461-46N (generally referred to as "46"), where each sensor 46 is associated with (e.g., coupled to, disposed in, located near, etc.) a respective one of the fuel reservoirs 22.

The controller 20 is arranged in signal communication (e.g., hardwired and/or wirelessly coupled) with the fuel delivery system 26, the fuel transfer system 28 and the sensor system 18. The controller 20 may be configured as an onboard engine controller for the aircraft powerplant 14; e.g., an electronic engine controller (EEC), an electronic control unit (ECU), a full-authority digital engine controller (FADEC), etc. Alternatively, the controller 20 may be arranged in signal communication with the onboard engine controller. The controller 20 may be implemented with a combination of hardware and software. The hardware may include memory 48 and at least one processing device 50, which processing device 50 may include one or more single-core and/or multi-core processors. The hardware may also or alternatively include analog and/or digital circuitry other than that described above.

The memory 48 is configured to store software (e.g., program instructions) for execution by the processing device 50, which software execution may control and/or facilitate performance of one or more operations such as those described below. The memory 48 may be a non-transitory computer readable medium. For example, the memory 48 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 2:
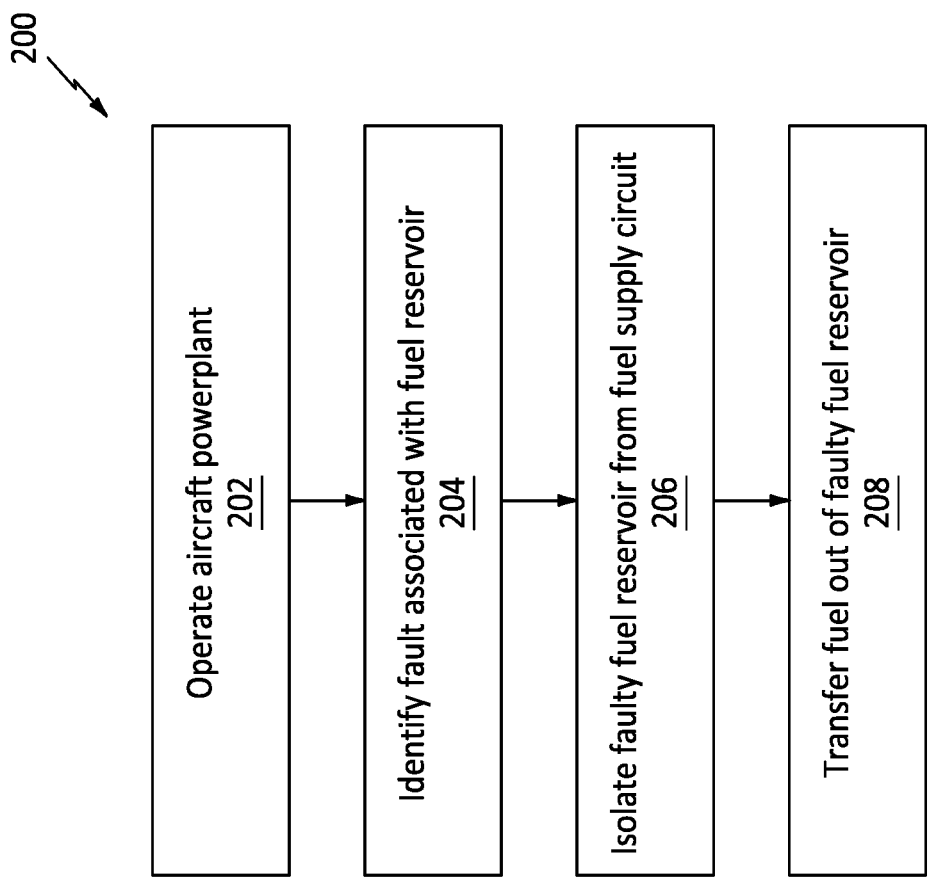
FIG. 2 is a flow diagram of a method of operation for an aircraft system.

FIG. 2 is a flow diagram of a method 200 of operation for an aircraft system. For ease of description, the operating method 200 of FIG. 2 is described below with respect to the aircraft system 10 of FIG. 1. The operating method 200 of the present disclosure, however, is not limited to performance with such an exemplary aircraft system.

In step 202, the aircraft powerplant 14 is operated to facilitate aircraft propulsion (e.g., thrust and/or lift) and/or power generation. During this powerplant operation, the controller 20 signals the fuel system 16 and its fuel delivery system 26 to deliver a flow of the fuel from the array of fuel reservoirs 22 to the aircraft powerplant 14 through the fuel supply circuit 24. The fuel delivered to the aircraft powerplant 14 may be provided by (e.g., drawn from) any one or more or all of the fuel reservoirs 22. The fuel delivery system 26, for example, may direct fuel from any single one of the fuel reservoirs 22 to the aircraft powerplant 14 until the fuel in that respective fuel reservoir 22 is depleted. The fuel system 16 may then direct fuel from another one of the fuel reservoirs 22 to the aircraft powerplant 14. Of course, the fuel delivery system 26 may direct fuel from multiple of the fuel reservoirs 22 to the aircraft powerplant 14 when switching between those fuel reservoirs 22 to provide an uninterrupted flow of the fuel to the aircraft powerplant 14. In another example, the fuel delivery system 26 may direct fuel from multiple of the fuel reservoirs 22 simultaneously.

In step 204, a fault is identified associated with one of the fuel reservoirs 22. For example, utilizing sensor data received from one or more of the sensors 46, the controller 20 may determine presence of a fault associated with, by way of example, the first fuel reservoir 221. For example, where a pressure within the first fuel reservoir 221 is changing (e.g., decreasing) when that first fuel reservoir 221 is not being utilized or is changing at an unexpected rate (e.g., faster than expected), the controller 20 may identify a fuel leak from the first fuel reservoir 22 (or fuel line coupled thereto). Of course, various other fault identification processes (e.g., fuel leak detections processes) are known in the art, and the present disclosure is not limited to any particular ones thereof.

In step 206, the faulty fuel reservoir 22 is isolated from the fuel supply circuit 24. For example, when the fault is identified associated with the first fuel reservoir 221, the controller 20 may signal the fuel delivery system 26 and its first reservoir flow regulator 341 (e.g., a control valve) to fluidly decouple the first fuel reservoir 221 from the fuel supply manifold 32 and, thus, the fuel supply circuit 24.

In step 208, fuel is transferred out of the faulty fuel reservoir 22. For example, when the fault is identified associated with the first fuel reservoir 221, the controller 20 may signal the fuel transfer system 28 to transfer at least some or all of the fuel contained within the first fuel reservoir 22 into any one or more or all of the other fuel reservoirs 222-22N, where this fuel being transferred may be in a liquid phase (e.g., liquid hydrogen ($H_2$)) and/or a gaseous phase (e.g., hydrogen ($H_2$) gas). For example, the controller 20 may signal the first transfer valve 421 and the second transfer valve 422 to open. The controller 20 may then signal the first transfer pump 441 to pump some or all of the fuel out of the first fuel reservoir 221 into the second fuel reservoir 222. In another example, the controller 20 may signal the first transfer valve 421 and the third transfer valve 423 to open. The controller 20 may then signal the first transfer pump 441 and/or the second transfer pump 442 to pump some or all of the fuel out of the first fuel reservoir 221 into the third fuel reservoir 223. In still another example, the controller 20 may signal the first transfer valve 421, the second transfer valve 422 and the third transfer valve 423 to open. The controller 20 may then signal the first transfer pump 441 and/or the second transfer pump 442 to pump some or all of the fuel out of the first fuel reservoir 221 into the second fuel reservoir 222 and the third fuel reservoir 223. Of course, various other variations are possible and contemplated by the present disclosure. Moreover, while the fuel transferring is described above as an active pumping process, it is contemplated the fuel may also or alternatively be passively transferred from the first fuel reservoir 221 to one or more of the other (non-faulty) fuel reservoirs 222-22N by opening the respective transfer valves 42 to equalize a fuel parameter (e.g., a pressure) of the fuel in the respective fuel reservoirs 22. By actively or passively transferring the fuel between the fuel reservoirs 22, the fuel from the first fuel reservoir 221 may be preserved without venting as well as contained in fuel reservoir(s) 222-22N without a fault.

Before transferring the fuel out of the first fuel reservoir 221, the controller 20 may determine which of the other (non-faulty) fuel reservoirs 222-22N is to receive the fuel from the first fuel reservoir 221. This selection may be made based on which of the other (non-faulty) fuel reservoirs 222-22N currently contains the smallest quantity of fuel and, thus, can accommodate some or all of the fuel from the first fuel reservoir 221. In addition or alternatively, the selection of the fuel reservoir 222-22N to receive the fuel may be made based on proximity to the first fuel reservoir 221.

Under certain circumstances, a quantity of the fuel in the first fuel reservoir 221 may be greater than an available capacity of one, some or all of the other (non-faulty) fuel reservoirs 222-22N. For example, each of the other (non-faulty) fuel reservoirs 222-22N may already be partially or completely full of fuel. During such circumstances, the controller 20 may temporarily alter (e.g., increase) a predetermined maximum capacity (e.g., pressure capacity) of one or more of the other (non-faulty) fuel reservoirs 222-22N. The controller 20 may then signal the fuel transfer system 28 to transfer the fuel from the first fuel reservoir 221 into one, some or all of the other (non-faulty) fuel reservoirs 222-22N until those fuel reservoirs 222-22N are filled to the new (increased) maximum capacity. In other words, the other (non-faulty) fuel reservoirs 222-22N may be temporarily over-filled (e.g., over-pressurized) to accommodate the fuel from the first fuel reservoir 221 until the fault associated with the first fuel reservoir 221 can be fixed. In addition or alternatively, the controller 20 may signal the fuel transfer system 28 to vent some of the fuel directed out of the first fuel reservoir 221 into an environment external to the aircraft system 10 and, more generally, external to the aircraft 12 through an optional vent circuit 52. This venting may be performed concurrently with the transferring of some of the fuel into the other (non-faulty) fuel reservoir(s) 222-22N or following the transfer of the fuel; e.g., once the other (non-faulty) fuel reservoir(s) 222-22N are filled to capacity.

During the performance of the steps 206 and 208, the step 202 may continue to be performed in order to provide a continuous flow of the fuel to the aircraft powerplant 14.

In some embodiments, an alert may be generated and communicated following the identification of the fault and/or following the transferring of the fuel between the fuel reservoirs 22. This alert may be provided to personnel operating the aircraft 12 (e.g., a pilot), maintenance personnel, etc. The alert may also be provided to the onboard engine controller such that operation of the aircraft powerplant 14 may be adjusted as needed. Power output from the aircraft powerplant 14, for example, may be derated to facilitate increased fuel efficiency, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
delivering fuel to a powerplant using a fuel system, the powerplant and the fuel system arranged onboard an aircraft, the fuel system including a first fuel reservoir and a second fuel reservoir, and the first fuel reservoir containing a quantity of the fuel; and
transferring at least some of the quantity of the fuel contained in the first fuel reservoir into the second fuel reservoir when a fault is identified associated with the first fuel reservoir;
wherein the transferring of the fuel from the first fuel reservoir into the second fuel reservoir increases a second fuel reservoir quantity of the fuel above a predetermined maximum capacity of the second fuel reservoir.

2. The method of claim 1, wherein the fuel comprises hydrogen fuel.

3. The method of claim 1, wherein at least some of the fuel transferred from the first fuel reservoir into the second fuel reservoir is in a gaseous phase.

4. The method of claim 1, wherein at least some of the fuel transferred from the first fuel reservoir into the second fuel reservoir is in a liquid phase.

5. The method of claim 1, further comprising identifying the fault associated with the fuel first reservoir.

6. The method of claim 1, wherein the fault comprises a fuel leak.

7. The method of claim 1, wherein the fault is indicative of a fuel leak from the first fuel reservoir.

8. The method of claim 1, wherein the fault is indicative of a fuel leak from a fuel line fluidly coupled to the first fuel reservoir.

9. The method of claim 1, further comprising:
fluidly decoupling the first fuel reservoir from a supply circuit of the fuel system when the fault is identified associated with the first fuel reservoir; and
the delivering of the fuel comprising delivering the fuel to the powerplant through the supply circuit.

10. The method of claim 1, wherein the fuel is delivered to the powerplant using the fuel system before, during and after the transferring of the fuel from the first fuel reservoir into the second fuel reservoir.

11. The method of claim 1, wherein the transferring comprises pumping at least some of the quantity of the fuel contained in the first fuel reservoir into the second fuel reservoir.

12. The method of claim 1, wherein the transferring comprises opening a valve between the first fuel reservoir and the second fuel reservoir to equalize a fuel parameter between the first fuel reservoir and the second fuel reservoir.

13. The method of claim 1, further comprising transferring some of the quantity of the fuel contained in the first fuel reservoir into a third fuel reservoir of the fuel system when the fault is identified associated with the first fuel reservoir.

14. The method of claim 1, further comprising venting some of the quantity of the fuel contained in the first fuel reservoir to an environment external to the aircraft during and/or following the transferring of the fuel from the first fuel reservoir into the second fuel reservoir.

15. The method of claim 1, wherein the powerplant comprises a heat engine.

16. The method of claim 1, wherein the powerplant comprises a fuel cell.

17. An assembly for an aircraft, comprising:
an aircraft powerplant; and
a fuel system including a supply circuit, an array of fuel reservoirs and a fuel control system;

the array of fuel reservoirs including a first fuel reservoir and a second fuel reservoir, and the first fuel reservoir and the second fuel reservoir fluidly couplable to the supply circuit in parallel; and the fuel control system including a fuel delivery system and a fuel transfer system, the fuel delivery system configured to direct fuel stored in the array of fuel reservoirs to the aircraft powerplant through the supply circuit, the fuel delivery system in fluid communication with the array of fuel reservoirs via outlets of the array of fuel reservoirs, the fuel transfer system configured to transfer at least some of a quantity of the fuel contained in the first fuel reservoir into the second fuel reservoir following identification of a fault associated with the first fuel reservoir while the fuel continues to be directed to the aircraft powerplant through the supply circuit, and the fuel transfer system in fluid communication with the array of fuel reservoirs via transfer apertures of the array of fuel reservoirs;

wherein the fuel transfer system is discrete from the fuel delivery system.

18. The assembly of claim 17, wherein the fuel system is a hydrogen fuel system;

the first fuel reservoir is a first liquid hydrogen reservoir; and the second fuel reservoir is a second liquid hydrogen reservoir.

* * * * *